US012133996B2

(12) United States Patent
Meschi

(10) Patent No.: US 12,133,996 B2
(45) Date of Patent: Nov. 5, 2024

(54) BIDIRECTIONAL REUSABLE FILTERING FACE MASK

(71) Applicant: UPBIOCARE S.R.L., Genoa (IT)

(72) Inventor: Oscar Meschi, Genoa (IT)

(73) Assignee: UPBIOCARE S.R.L., Genoa (IT)

( * ) Notice: Subject to any disclaimer, the term of this patent is extended or adjusted under 35 U.S.C. 154(b) by 9 days.

(21) Appl. No.: 17/997,565

(22) PCT Filed: Apr. 29, 2021

(86) PCT No.: PCT/IB2021/053576

§ 371 (c)(1),
(2) Date: Oct. 31, 2022

(87) PCT Pub. No.: WO2021/224734

PCT Pub. Date: Nov. 11, 2021

(65) Prior Publication Data

US 2023/0218931 A1 Jul. 13, 2023

(30) Foreign Application Priority Data

May 4, 2020 (IT) ........................ 102020000009631

(51) Int. Cl.
*A62B 18/02* (2006.01)
*A62B 18/00* (2006.01)
(Continued)

(52) U.S. Cl.
CPC .......... *A62B 18/025* (2013.01); *A62B 18/006* (2013.01); *A62B 18/10* (2013.01); *A62B 23/02* (2013.01)

(58) Field of Classification Search
CPC ..... A62B 18/025; A62B 18/006; A62B 18/10; A62B 18/088; A62B 18/08; A62B 23/02; A62B 23/025; A41D 13/11
See application file for complete search history.

(56) References Cited

U.S. PATENT DOCUMENTS 10,625,102 B1 * 4/2020 Chen ...................... A62B 18/10
2007/0044802 A1 3/2007 Horne et al.
(Continued)

FOREIGN PATENT DOCUMENTS

CN 207477007 U 12/2018
KR 20110026744 A 3/2011
(Continued)

OTHER PUBLICATIONS

International Search Report for International Application No. PCT/IB2021/053576 mailed Nov. 11, 2021.
(Continued)

*Primary Examiner* — Kendra D Carter
*Assistant Examiner* — Brian T Khong
(74) *Attorney, Agent, or Firm* — Perilla Knox & Hildebrandt LLP; Kenneth A. Knox

(57) ABSTRACT

A bidirectional reusable filtering face mask is described that includes an anatomical base provided with means to promote adherence to the face and pass-through elements for closure by means of ties; a first filtering chamber used to prevent respiratory droplets from spreading and obtained by fixing a removable disposable filter on the outer side of the anatomical base; a second filtering chamber comprising a removable dome with a recess in its apical part adapted to accommodate a main removable disposable filter, where the filter is secured to the recess by means of a protective grid; and means for assembling the components of the second filtering chamber with the first filtering chamber.

20 Claims, 5 Drawing Sheets

(51) Int. Cl.
*A62B 18/10* (2006.01)
*A62B 23/02* (2006.01)

(56) References Cited

U.S. PATENT DOCUMENTS

| | | | | |
|---|---|---|---|---|
| 2009/0065006 | A1 | 3/2009 | Patterson | |
| 2010/0269832 | A1* | 10/2010 | Lin | A62B 23/02 128/206.19 |
| 2012/0042878 | A1* | 2/2012 | Woo | A62B 7/10 128/206.15 |
| 2015/0034098 | A1 | 2/2015 | Schumacher | |
| 2018/0008848 | A1* | 1/2018 | Moulton | A41D 13/11 |
| 2021/0330853 | A1* | 10/2021 | Mizandari | A62B 7/10 |

FOREIGN PATENT DOCUMENTS

| | | | | |
|---|---|---|---|---|
| KR | 20160111349 | A | 9/2016 | |
| WO | 2008128392 | A1 | 10/2008 | |
| WO | 2010064862 | A2 | 6/2010 | |
| WO | 2015034098 | A1 | 2/2015 | |
| WO | WO-2016098132 | A1 * | 6/2016 | A61M 15/08 |
| WO | 2017142126 | A1 | 8/2017 | |
| WO | 2019112372 | A1 | 6/2019 | |

OTHER PUBLICATIONS

Written Opinion for International Application No. PCT/IB2021/053576 mailed Nov. 11, 2021.

* cited by examiner

BIDIRECTIONAL REUSABLE FILTERING FACE MASK

CROSS REFERENCE TO RELATED APPLICATIONS

This application is a national phase application under 35 U.S.C. 371 of International Application No. PCT/IB2021/053576 filed Apr. 29, 2021, entitled "BIDIRECTIONAL REUSABLE FILTERING FACE MASK," which claims the benefit of and priority to Italian Patent Application No. 102020000009631 filed May 4, 2020, the contents of both of which being incorporated by reference in their entireties herein.

TECHNICAL FIELD

The present disclosure relates to the field of personal protective equipment (PPE), particularly respiratory masks used to filter the air breathed by people wearing such masks.

More precisely, it refers to a conveniently employable bidirectional filtration device to be worn profitably and advantageously, improving durability, production speed, safety and recyclability thereof.

BACKGROUND

The trade term "respiratory masks" usually refers to a family of masks intended to limit the transmission of infectious agents from staff to patients and vice versa, in certain situations during surgical procedures in operating theatres and other medical environments having similar requirements and/or intended for different types of working environments. This term therefore includes articles with different characteristics as regards materials and sometimes pattern, although the prevailing type is known to be disposable, made of a multilayer non-woven fabric with a rectangular or possibly gusseted shape.

Such respiratory masks are generally secured to the face by means of ties or elastic bands to be passed behind the ears or tied behind the nape of the neck; some models of such devices are further provided with a flexible wire for a better adherence to the nasal septum.

The masks approved for use as medical devices are also tested to ensure specific levels of protection against blood and other biological fluids penetrating through the mucous membranes of the nose and mouth.

Masks provide protection against the spread of influenza and other viruses that propagate by the so-called "droplet" mechanism, therefore they firstly block the droplets of respiratory secretions emitted by people wearing them; secondly, and only partially, they prevent the same droplets or sprays of secretions or other external biological fluids from reaching the mucous membranes of the nose and mouth of those wearing them. This is because the constituent material, or at least that of the outer layer in case of multiple layers, is impermeable to liquid droplets but allows air to pass through to let you breathe. As a result, these PPEs are not able to protect against fine aerosols that may contain very small infectious particles such as viruses.

Respiratory masks, to be safe, must be produced in compliance with the technical standards in force relating to the field of application in which they are to be used, such standards provide for characteristics and test methods, indicating the requirements of: liquid splashes resistance, breathability, bacterial filtration efficiency, being microbe-free.

Once used, disposable masks shall be disposed of immediately, as shall the filtering elements of reusable masks.

BRIEF SUMMARY

The present disclosure provides a conveniently employable device which allows to solve or at least considerably reduce the drawbacks of the related art. In said context, the Applicant has identified a system for reducing the bacteriological or viral proliferation by preserving one or more filters exposed with the external environment through the use of a pre-chamber provided with an anti-splash or anti-droplet filter allowing separating said pre-chamber from a traditional respiratory chamber. This mask that can be sterilised and reused with interchangeable filters, enables dramatically containing costs by reducing the production operations of the replaceable filtering components, ensuring a longer life and at the same time quality of results, both in terms of safety and in terms of adaptability, usability and ease of use.

Such results are achieved with the double-chamber protective mask according to the present disclosure, the essential features of which are defined in the claims appended to this description and the main objects of which are summarized below.

A device is described that allows to separate the filtering tissue in contact with the mouth and nose from the filtering device in contact with the external environment by a separation chamber, limiting the moistening of the filtering material in contact with the external environment and thus prolonging the duration and reliability of use.

A further object of the present disclosure is to provide a device that allows to optimally adhere to the face.

A further object of the present disclosure is to provide a device having removable disposable filters and that allows to possibly use glasses in an optimal manner.

A further object of the present disclosure is to provide a device that allows to replace filters easily and safely.

A further object of the present disclosure is to provide a device that can be used in a variety of conformations.

A further object of the present disclosure is to provide a device that allows to apply one or more check valves for optimal air escape with or without using an additional filter.

A further object of the present disclosure is to provide a device that allows to apply a battery-powered forced recirculation device with or without using an additional filter.

A further object of the present disclosure to provide a device that allows to connect the mask to a fixed forced ventilation device or system with or without using an additional, possibly remote, filter.

A further object of the present disclosure is to provide a product which, with respect to the above listed features, can be adapted to further commercial needs regardless of the environment of use.

Finally, a further object of the present disclosure is to make, following the same objects described in the previous points, a comfortable mask made of an anti-allergic plastic material which can be sterilised, easy to use, assemble and with low production costs.

The double-chamber protective mask according to the disclosure solves the highlighted problems and reaches the described objects by using a pre-chamber separating the filtering components in contact with the external environment and a filtering component that is in closer contact with the nose and mouth and intended to provide an anti-splash and anti-humidity protection, avoiding propagation thereof, through the same filter, to the filtering components in contact with the external environment.

The resolving principle underlying the disclosure is to use a pre-chamber with a disposable filter to prevent contamination and provide a degree of separation between the filter or filters in contact with the external environment and the portion of the mask in contact with the wearer's nose and mouth.

In order to further prolong the life of the filtering elements as well as to increase the comfort of the mask itself, the use of external or battery-powered forced ventilation systems of the chambers is possibly envisaged, so as to reduce the accumulation of humidity and CO2 inside the mask and ensure a longer life of the filtering components as well as a higher degree of protection, greater comfort and improved breathability under fatigue conditions.

The double-chamber protective mask according to the disclosure consists of various components (e.g., six components) comprising:

An anatomical base made of flexible plastic or silicone material overmoulded on a core or ring nut made of a more rigid plastic material which incorporates in its design pass-through elements to secure the mask to the face by means of ties or elastic bands to be passed behind the ears or tied behind the nape of the neck, peg elements necessary to position a preliminary filter exposed to the mucous membranes or droplet filter, fixing eyelets, main quick-coupling clips and secondary quick-coupling clips necessary to connect a closure element used to seal the previous filter;

An interchangeable droplet filter made of a multilayer non-woven fabric or other functionally equivalent material, which is positioned through said dedicated elements or pegs located on the anatomical base component in a unique manner and having one or more tabs for safe removal of the filter once contaminated.

A plastic closure containing within its design two main quick-coupling clips and two or more secondary quick-coupling clips used for the connection with the anatomical base component, recesses for the peg seats and the other components necessary for holding in place and sealing a droplet filter. The closure element, within its design, further contains a recess for an extraction tab and other elements necessary for inserting and holding in place an intermediate element called pre-chamber dome;

Said pre-chamber dome is made of flexible plastic or silicone material and contains within its design a tab and other fasteners necessary for inserting and holding in place inside the aforementioned closure component, a central hole necessary for positioning a main filter and its main filter closure or, alternatively, other accessories described later adapted to perform the same function. The connection of said main filter closure with the corresponding pre-chamber dome may for example occur by quick coupling through a groove and a bead present on the two components, correctly positioned through at least one unique key within the recess. Said pre-chamber dome may optionally have one or more holes for the insertion of one or more check valves or fittings or both, with or without the relevant filter, or other accessories adapted to perform the same function described later;

An interchangeable main filter made of a multilayer non-woven fabric or other material having the same function, which is positioned correctly by means of one or more unique keys within the recess and locked by means of a main filter closure or other accessories described later;

A plastic main filter closure containing within its design a bead or quick-coupling groove necessary for the connection with the pre-chamber dome component, the recess for a unique mounting key and other components necessary for holding in place and sealing a main filter. Among the accessories available and replaceable with those previously listed we finally find:

A ventilated main filter closure that performs the same functions as the main filter closure component it replaces, adding to said component a forced ventilation provided by a battery-powered fan and optionally air monitoring sensors and a data transmission system; A forced main filter closure that performs the same functions as the main filter closure component it replaces, adding said component with a connection (possibly with a check valve positioned on the pre-chamber dome component) for forced ventilation provided by a duct connected to an external system or an additional remote filter.

A forced check valve that performs the same functions as the optional check valve component it replaces, by adding to the same component a connection for forced ventilation provided by a duct connected to an external system or an additional remote filter.

The use of the above mentioned accessories requires the use of the pre-chamber dome with at least one optional hole for the insertion of one or more check valves or one of the other accessories or equivalent fittings described later as well as a membrane to ensure proper air circulation.

This hole for the check valve can be made on one side only or on both sides, allowing a greater volume of air to be expelled depending on the use and need.

Furthermore, the same mask can also be used without inserting the pre-chamber dome and the main filtration system, using only the droplet filter, in less risky environments that allow use thereof.

Therefore, according to the Applicant's disclosure, the device plays an innovative role in preserving the main filter, which in the case of commercially available masks is exposed to moistening by saliva droplets at a short distance from the oral cavity by using a double barrier consisting in the droplet filter and the space inside the pre-chamber dome.

The filtering elements can also receive further advantages in terms of durability through the use of forced or battery-powered ventilation components which keep the filter elements drier, reducing the accumulation of CO2 inside the mask and producing as a secondary effect a greater comfort due to the increased air recirculation inside the respiratory chambers.

If a ventilated main filter closure is used, it is also possible to add a further degree of filtration through the insertion of a filtering element at the inlet of the fan of the same component as well as further safety elements through sensors for monitoring the quality of the air and filters.

Said disclosure therefore has:

A key role in terms of use by greatly simplifying the assembly, disassembly and reassembly of the components;

A key role in terms of sterilization, greatly simplifying cleaning; A key role in terms of safety, reducing the possibility of cross-contamination between the two filter barriers;

A key role in terms of hygiene, simplifying the removal and replacement of the removable filter barriers;

A key role in terms of anatomy of masks that adapt very little to the face. A key role in terms of recycling by easily allowing reducing volumes and differentiating materials at the end of life and to generate a circular economy of the product.

BRIEF DESCRIPTION OF THE FIGURES

The features and advantages of the double-chamber mask obtained according to the present disclosure will be more clearly shown by the following description of an embodiment thereof, given by way of an exemplary and non-limiting example in the 5 attached drawings, wherein.

DETAILED DESCRIPTION

Figure 1:
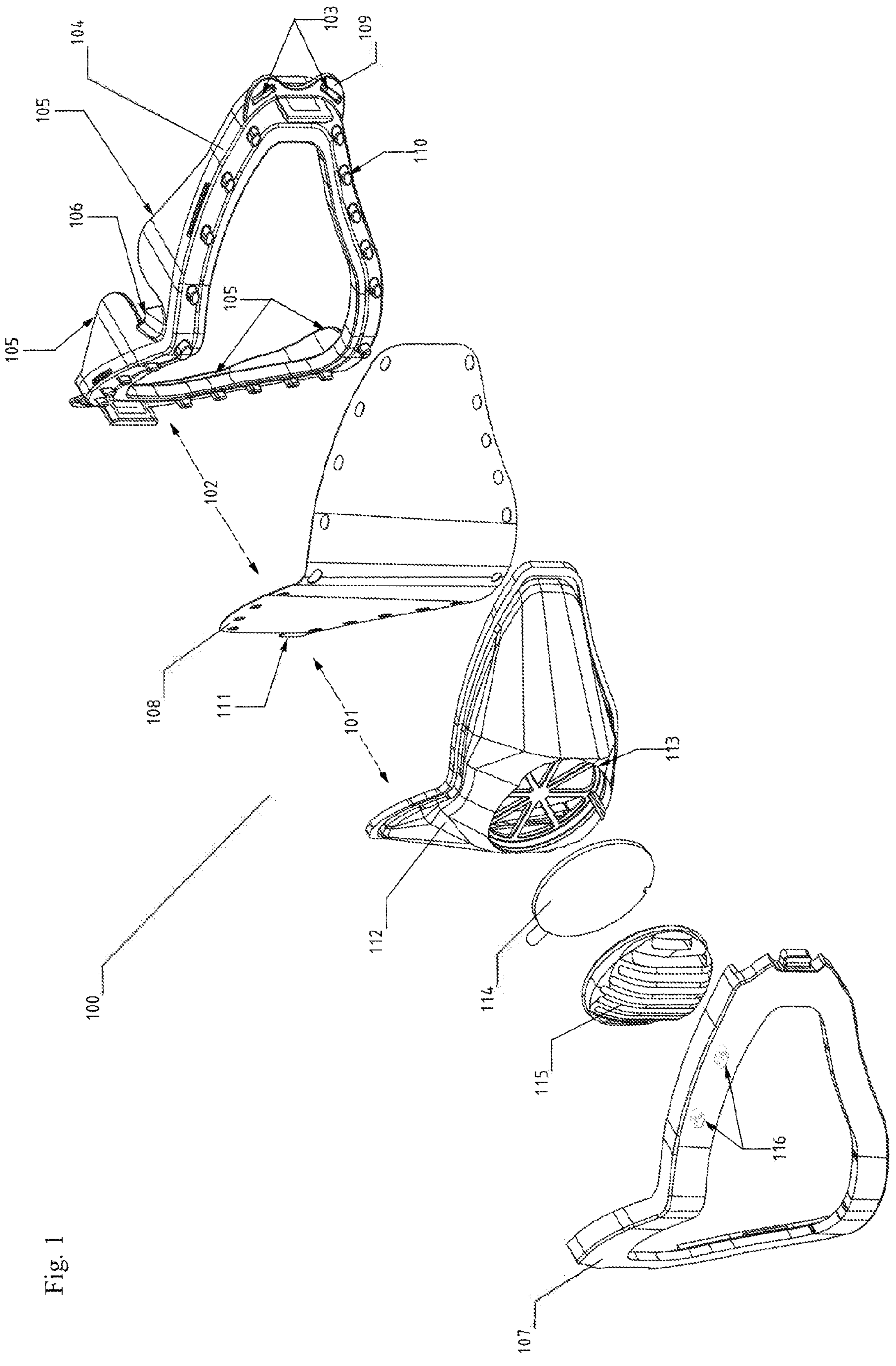
FIG. 1 illustrates the exploded diagram of the Double-Chamber Protective Mask in an isometric view

As respiratory masks prevent the wearer from contaminating the surrounding environment, they should be used correctly and effectively to limit the transmission of infectious agents. This is all the more true in the case of medical, paramedical or similar staff in contact with patients during surgical procedures and other medical and health care activities and, in particular, to avoid pandemic phenomena from spreading in particularly high-risk environments such as clinics/hospitals/ambulatories. For a correct use, it is necessary to follow suitable precautions to properly wear, remove and dispose of a respiratory mask; otherwise said device, which is used to reduce the risk of contagion, can become a source of infection due to germs, bacteria and viruses that might settle on it. Regarding its use, it is necessary to replace the mask with a new one as soon as it is damp and do not reuse disposable ones; and replace it without touching the front portion.

Operators using disposable masks are thus required to replace them regularly as soon as they become damp. Unfortunately, this happens quite frequently because they are typically worn in adherence to the oral and nasal cavities, thus being subject to being easily moistened. In particular, they are subject to a latent but constant and significant moistening action due to the common and natural emissions of a person while talking and breathing normally; not only from acute phenomena such as sneezing. This reasonably reduces the life of most respiratory masks to a time span of a few hours.

The above-mentioned problems of limited life and frequent replacement may seem apparently negligible, since they are devices that are natively disposable and, above all, low cost, but they are of great importance in the hospital environment, especially in extraordinary circumstances such as pandemic events that put the healthcare system structures and staff under great stress. In fact, in these circumstances two serious problems can arise:

- a lack of mask supply such that it would be desirable to make the best use of the few masks available in stock and, above all, to have them last longer (obviously without any loss of performance or increase in risk);
- a factor of very high psychophysical stress for health care operators who, being subjected to frequent mask changes, may reasonably and understandably forget to perform the replacement operation, exposing patients and themselves to greater risks of contagion and spread.

The above-mentioned problems, despite being prominent and crucial, are not the only ones afflicting this type of objects: important problems are reported about how these devices fit and in particular problems related to their proper positioning and stable adherence to the face. Although surgical masks are designed to prevent the wearer from contaminating the surrounding environment, it is obviously desirable that they also provide a reasonable, even if limited, barrier effect for the wearer in contaminated and hostile environments. Unfortunately, commercially available masks, being produced in a few formats and in standard sizes and being easily deformable, do not often perfectly adhere to the face and above all are poorly adaptable to the features and dimensions of the face and particularly of the nose, mouth and to the proportions between them. As a result, they can often allow viruses or harmful agents to pass through conspicuous and macroscopic side apertures that tend to form during use.

Finally, a further problem with commercially available respiratory masks, especially when using disposable devices, is the recyclability of the product itself. As described above, the aforesaid masks are made of at least 3 different materials, which are not separated for sanitary reasons.

Figure 2:
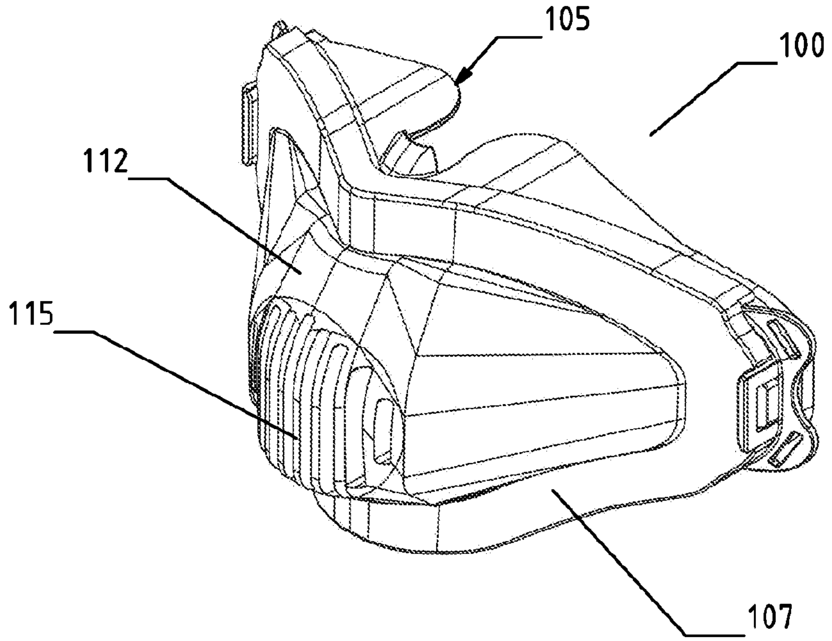
FIG. 2 illustrates the assembled Double-Chamber Protective Mask in an isometric view

With reference to the above mentioned figures, they are represented in the order:

- the wearable mask (100) which is intended to be realized according to the disclosure, that is, a bidirectional double-chamber filtering mask comprising a respiratory filtering chamber (101) and a separation pre-chamber to prevent droplets (102) from spreading; said mask (100) illustrated in its exploded (FIG. 1) and assembled form (FIG. 2), except for the components for fixing it to the face which can be inserted into appropriate pass-through elements (103);

As it can be seen from the two figures, the double-chamber mask comprises the following elements:

- An anatomical base (104) made of flexible plastic or silicone material that is intended to adhere to the face by means of tabs (105) shaped in an anatomical manner throughout the profile, to create a reference point for the assembly by means of a nasal half-dome (106) and also has a perimeter groove offset to the inner hole that together with the bead present on a closure component (107) is used to tighten together all the components ensuring a better sealing of an anti-splash or droplet (108) filter. This anatomical base (104) also consists of a core, referred to as ring nut (109), which can be incorporated while being produced or can be made extractable with respect to said anatomical base (104) and is made of a more rigid plastic material than the above-mentioned face adhering components (105), (106). Said ring nut (109) incorporates in its design some pass-through elements (103) adapted to secure the mask to the face by means of ties or elastic bands to be passed behind the ears or tied behind the nape of the neck and includes fixing pegs (110) necessary for fixing the anti-splash or droplet filter (108); some of said pegs (110) being also usable for positioning and univocally centring the filter itself (108). There are also fixing eyelets and main quick-coupling clips present on the closure component (107) as well as beads for secondary quick-coupling clips necessary to connect the same element (107) to the anatomical base (104). In the event that the ring nut (109) is incorporated into the anatomical base (104), the two materials will be made integral with each other by the use of steps, overlaps and/or scaled holes creating single-piece rivets during over-injection;

A droplet filter (108) made of a multilayer non-woven fabric or other material having the same function, which is replaceable and interchangeable, suitably pierced to be positioned and fixed by means of the pegs (110) present on the anatomical base component (104) in a unique manner; said filter acts as the innermost wall of the pre-chamber (101) as well as the outermost wall of the second chamber (102) that is formed with the face once the mask (100) is worn. Such filter (108) has one or more tabs (111) to facilitate the removal of the same in a safe manner once contaminated or made unusable and temperature- and humidity-sensitive markers of use; said markers being employable to signal to users that said filters (108), (114) were previously used and signalling a possible contamination.

A pre-chamber dome (112) made of flexible plastic material or alternatively made of a silicone material comprising at least a tab necessary for the connection and positioning within the closure component (107), a central hole (113) necessary for positioning at least a main filter (114) with a unique key for fixing within the recess (113) and the subsequent insertion of a protective grid or main filter closure (115). Such pre-chamber dome (112) has the function of creating together with its own main filter (114) and the droplet filter (108) the so-called pre-chamber (101);

A main filter (114) made of a multilayer non-woven fabric or other material having the same function, interchangeable, which is positioned in a correct way through a unique key inside the hole (113) of the pre-chamber dome (112) and further locked through the main filter closure (115) such filter (114) has one or more tabs to facilitate the removal of the same in a safe way once contaminated or unusable; The main filter (114) can be safely removed from the pre-chamber dome (112), said dome (112) being made of flexible material, making it easy to remove the relative main filter closure (115);

A main filter closure (115) made of plastic material provided with a bead for quick coupling necessary to be connected with the pre-chamber dome component (112) used for holding in place and sealing the main filter (114), such main filter closure (115) may include fixing pegs necessary for pre-positioning the main filter (114);

A closure (107) made of plastic material in which they are visible the overlaps for hooking onto the anatomical base (104) necessary for a further degree of sealing against dirt and the realization of the secondary quick-coupling elements that interact with the beads arranged on the anatomical base component (104), and one of the two main quick-coupling clips with relative bead serving as main connection for engaging said part (107) to the anatomical base component (104) by means of eyelets present thereon, said closure (107) can include fixing pegs (110) necessary for pre-positioning the anti-splash or droplet filter (108) and, possibly, the seats corresponding to said pegs (116) will be obtained in the base (104).

Figure 3:
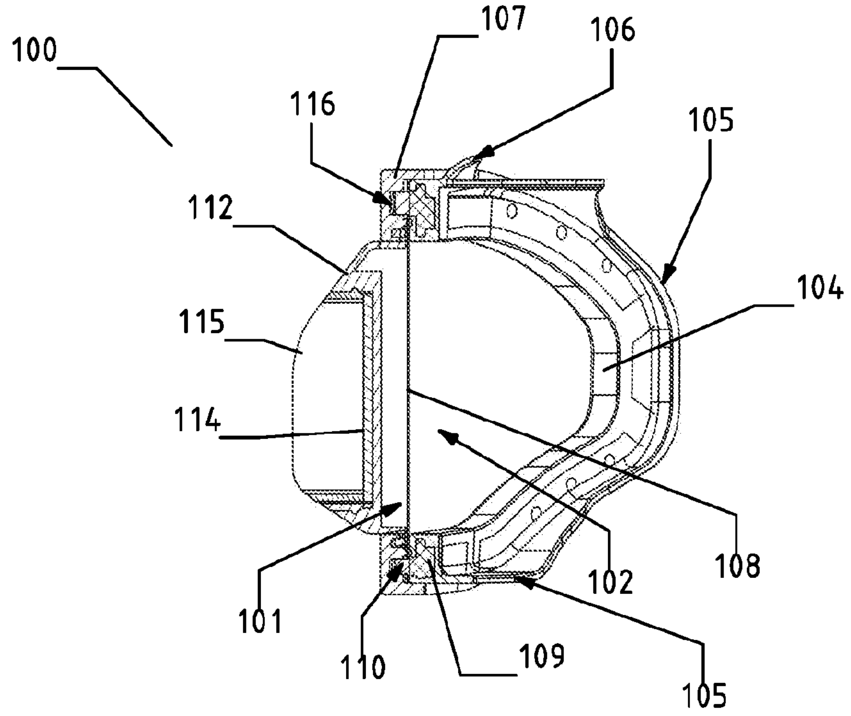
FIG. 3 illustrates the assembled Double-Chamber Protective Mask in a section view.

With reference to the aforementioned figures and particularly to FIG. 3, it is illustrated the wearable mask intended to be realized according to the disclosure i.e. a double-chamber (101),(102) mask (100) in its assembled form and of typical use except for the sectioned face fixing components; As it can be seen from the figure, the mask (100) with double-chamber (101),(102) comprises the following elements:

An 'Anatomical Base' (104) made of flexible plastic or silicone material where some details of the shaped tabs (105), the nasal half-dome (106), the perimeter groove offset to its inner hole and the core defined as ring nut (109) with relative pegs (110) previously described are visible;

A droplet filter (108) made of a multilayer non-woven fabric or other material having the same function;

A pre-chamber dome (112) made of flexible plastic or silicone material wherein some previously described details of the tab and of the fixing recess with the closure component (107), the hole (113) for positioning the main filter (114) and the relative groove for inserting by means of quick coupling the main filter closure (115) are visible, the so-called pre-chamber (101) formed by the pre-chamber dome (112) and by the relative main filter (114) on one side and the droplet filter (108) on the opposite side is also visible.

An extractable and removable main filter (114) made of a multilayer non-woven fabric or other material having the same function.

A main filter closure (115) made of plastic material where some details of the bead for the quick coupling are visible.

Figure 4:
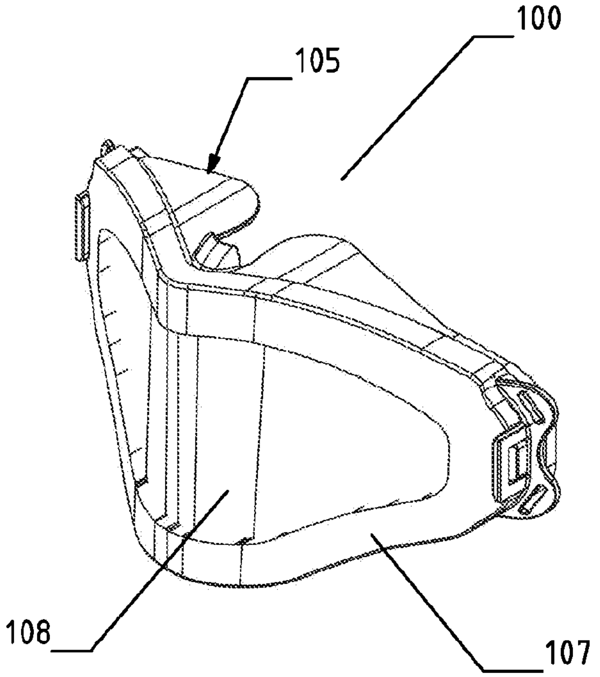
FIG. 4 illustrates the assembled Double-Chamber Protective Mask in the version without using the pre-chamber dome in an isometric view.

A closure (107) made of plastic material wherein some previously described details of the tab and of the recess for fixing with the pre-chamber dome component (112), the seats (116) corresponding to the pegs (110) located on the base component (104), the bead offset to the inner hole necessary for sealing the droplet filter (108) and the overlaps on the anatomical base part (104) are visible. With reference to the aforementioned figures and particularly to FIG. 4, it is shown an implementation alternative to the embodiment illustrated so far and applicable to the wearable mask (100) intended to be realized according to the disclosure in its semi-assembled form and typically used in little severe conditions, that is, only with the filtration chamber (102).

Figure 5:
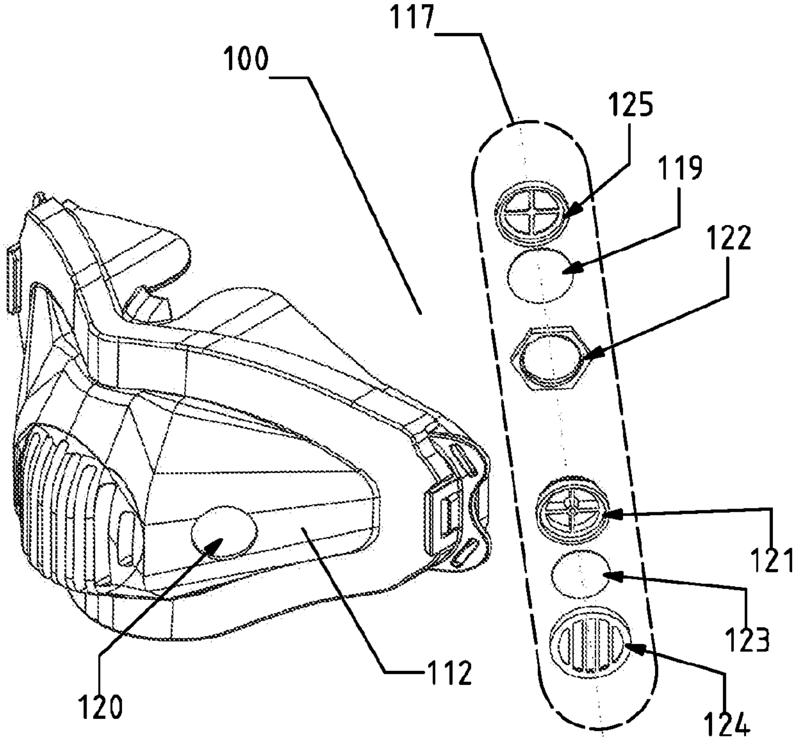
FIG. 5 illustrates the assembled Double-Chamber Protective Mask in the version with the exploded optional check valve in an isometric view.

With reference to the aforementioned figures and particularly to FIG. 5, it is shown an implementation alternative to the embodiment illustrated so far and applicable to the wearable mask intended to be realized according to the disclosure a mask (100) with a double-chamber (101),(102) in its assembled form and which can be typically used in more severe environments by inserting one or more check valves (117) with interchangeable filters (119) represented in an exploded view.

As it can be seen from the figure, such an alternative comprises the following elements:

A pre-chamber dome (112) made of flexible plastic or silicone material which, unlike the one previously described, has one or more holes (120) for housing one or more check valves (117) or alternatively components with the same functions described later;

A check valve (117) consisting of a flange (121) made of plastic material and associated bolt (122), a plug (123) made of silicone or other flexible material, a closing flange (124), an additional filter valve (119) made of non-woven fabric or alike, and a filter valve closure (125). Such example is to be considered purely indicative, since the same check valve can be replaced by other commercially available types.

Figure 6:
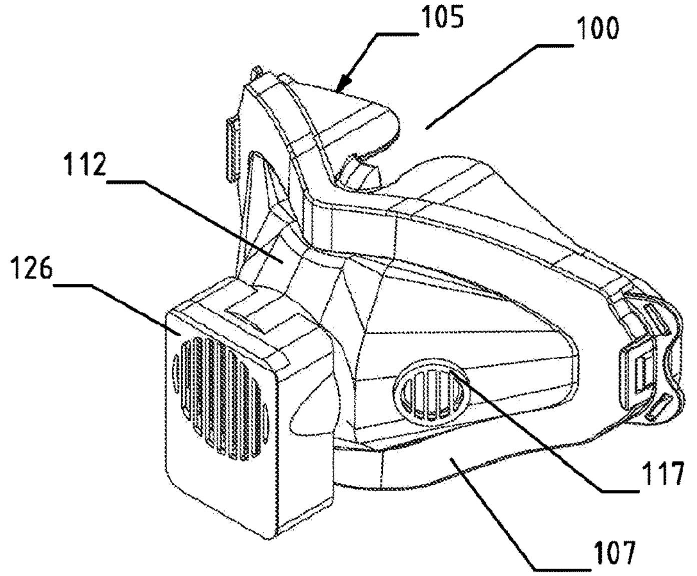
FIG. 6 illustrates the assembled Double-Chamber Protective Mask in the version with the optional check valve and the optional Ventilated Main Filter Closure device in an isometric view.
Figure 7:
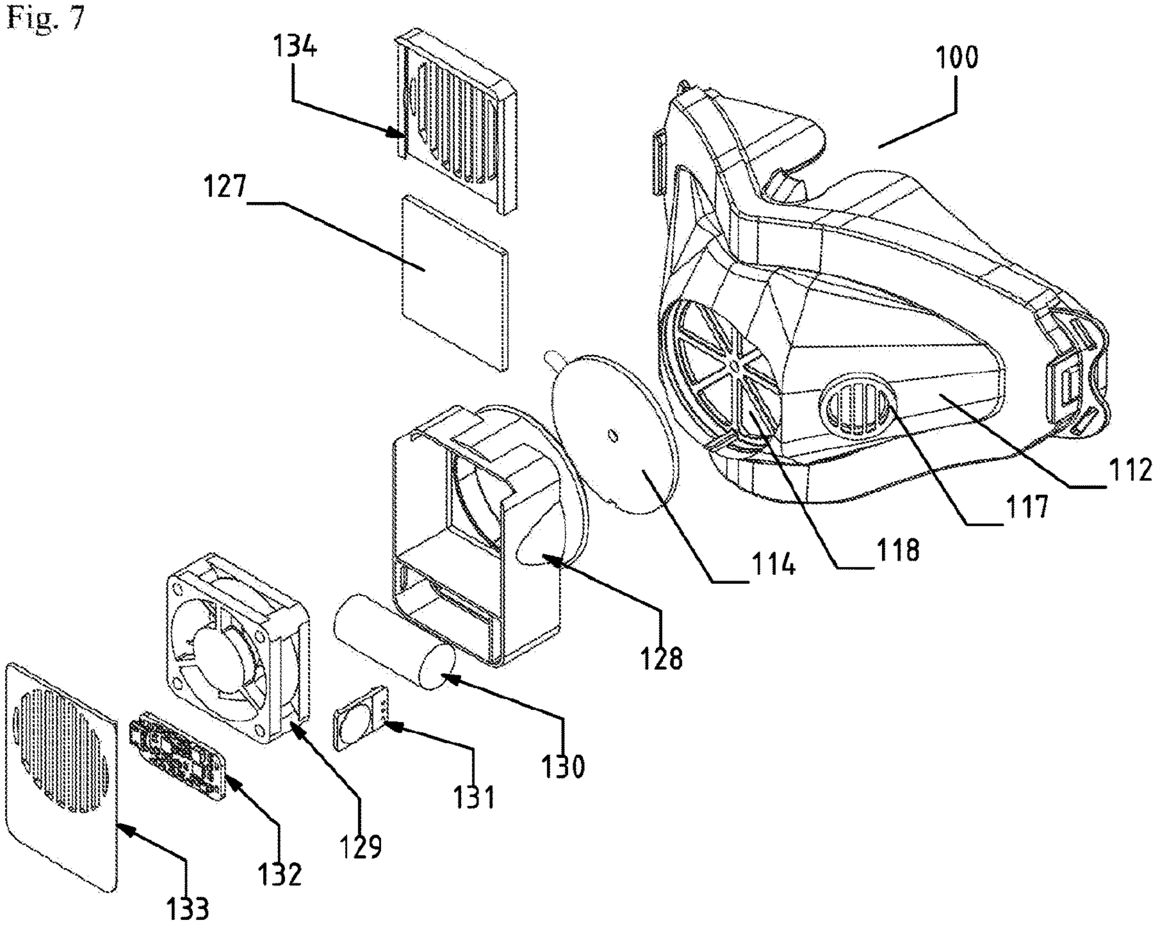
FIG. 7 illustrates the assembled Double-Chamber Protective Mask in the version with the optional check valve and the exploded optional Ventilated Main Filter Closure device in an isometric view.

With reference to the aforementioned figures and particularly to FIG. 6 and FIG. 7, it is shown an implementation alternative to the embodiment illustrated so far and applicable to the wearable mask intended to be realized according to the disclosure a mask (100) with a double-chamber (101),(102) in its typical form of use usable in more severe environments by inserting one or more check valves (117) and (118) and a ventilated main filter closure (126), said element being provided with further interchangeable filters (127) and illustrated in the order:

In FIG. 6 an assembled view of the same mask (100);

In FIG. 7 an assembled view of the same mask (100) with the ventilated main filter closure (126) in an exploded view.

As it can be seen from the figures, such an alternative comprises, in addition to the main components, the following elements:

A pre-chamber dome (112) with a hole (120);

At least one previously described check valve (117) and another inlet valve (118) positioned directly on the pre-chamber dome (112);

A ventilated main filter closure (126) to be installed as an alternative to the main filter closure (115), which, in addition to providing the advantages discussed in the previous paragraphs, performs the same functions as the replaced part; Said main ventilated filter closure (126) is composed of a main container (128) made of plastic material which contains a fan (129) with relative rechargeable battery (130), a capacitive switch (131), a control board (132) equipped with a processor and a radio transmitter used for managing sensors, which are also optional, designed to monitor the quality of filters and air, to prevent the degradation of the installed ones and to control/indicate the need for replacement locally or possibly by sending and collecting data on the Cloud for analysis using artificial intelligence techniques. A main container closure (133) made of plastic material, a ventilated closure filter (127) made of non-woven fabric or equivalent materials, and a ventilated closure filter holder (134).

Figure 8:
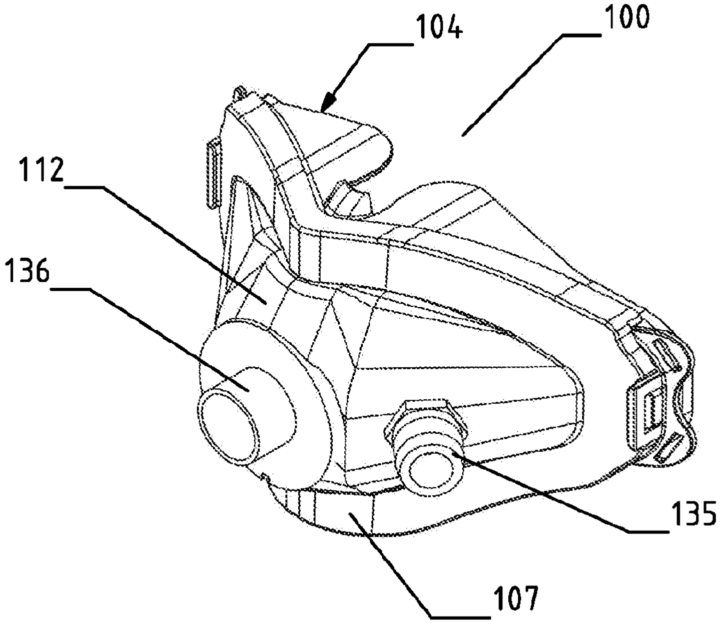
FIG. 8 illustrates the assembled Double-Chamber Protective Mask in the version with the optional Forced Check Valve and the optional Forced Main Filter Closure device in an isometric view.
Figure 9:
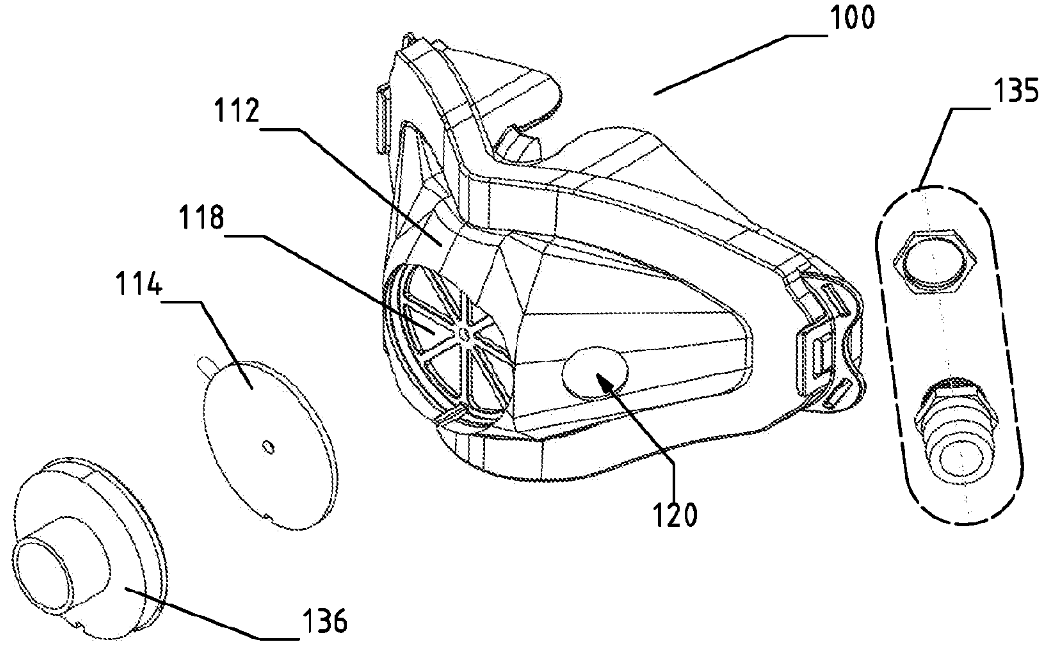
FIG. 9 illustrates the assembled Double-Chamber Protective Mask in the version with the exploded optional Forced Check Valve and the exploded optional Forced Main Filter Closure device in an isometric view.

With reference to the aforementioned figures and particularly to FIG. 8 and FIG. 9, it is shown an implementation alternative to the embodiment illustrated so far and applicable to the wearable mask intended to be realized according to the disclosure a mask (100) with a double-chamber (101),(102) in its typical form of use, usable in more severe environments, that is, with external ventilation or remote filters, which provides inserting a fitting (135) possibly provided with a check valve and which can be used for the connection to external ventilation tubes or remote filters and a ducted main filter closure (136) also provided with removable and interchangeable filters (114) and usable for the connection to forced ventilation tubes or remote filters. They are therefore represented in the order:

In FIG. 8 an assembled view of the same mask (100);

In FIG. 9 an assembled view of the same mask (100) with said fitting (135) and said ducted main filter closure (136) in an exploded view.

As it can be seen from the figures, such an alternative comprises, in addition to the main components, the following elements:

A pre-chamber dome (112) with a hole (120) previously described;

A fitting (135) made of plastic possibly provided with a check valve as previously described. Said fitting (135) allowing the air to be channelled out. This example is to be considered purely indicative, since said fitting and said possible check valve can be replaced with commercially available components;

A ducted main filter closure (136) to be installed as an alternative to the main filter closure (115), which performs the same functions as the replaced part as well as providing the advantages discussed in the previous paragraphs by allowing connection of the mask (100) to external oxygen ducts, cylinders, or similar equipment including remote filters.

INDUSTRIAL APPLICABILITY AND IMPLEMENTATION ALTERNATIVES

At the end of this disclosure, it is worth repeating that the Double-Chamber Protective Mask of the present disclosure is particularly simple and easy to manufacture in the automatic or semi-automatic industrial production.

In terms of materials, the Double-Chamber Protective Mask may be made, for example (therefore by way of a non-limiting example), with EVA and HDPE mixtures, but also with different materials without departing from the object of the disclosure. It should be noted that in the previous descriptions, for ease of synthesis and brevity, all those components and common operations, known to a person skilled in the art, related to aesthetic and functional refining typical of this kind of device have been neglected, including by way of example:

the shape and size of the hooking clips;

the shape and size of the nasal centering half-dome;

the shape and size of the anatomical flexible profiles of the base part;

the type of elastic bands used to secure the device to the face;

the size and shape of the pre-chamber;

the size and shape of the hole containing the filter and the main filter holder;

the application of decorations;

the incorporation of eye protection bodies in the design;

scale factors in order to make the double-chamber mask applicable to contexts differing from the main sanitary one described so far, such as the manufacturing one.

Finally, as already mentioned several times, but it is worth repeating once again, the disclosure just described can be adapted to several variants which can offer further advantages with respect to those previously mentioned. Such further variants may reasonably be made by the person skilled in the art without thereby departing from the disclosure as it appears from the present description and appended claims. Furthermore, the disclosure may be realized partially, as well as all the various details described may be replaced by technically equivalent elements or solutions.

The invention claimed is:

1. A bidirectional reusable filtering face mask for preventing bacteriological and viral contaminations transmissible by means of respiratory droplets emissions, comprising:

an anatomical base, the anatomical base comprising means for adherence to a face and pass-through elements employable for closing the mask by mean of ties, the mask comprising:

a first filtering chamber configured to prevent respiratory droplets from spreading, the first filtration chamber comprising a removable disposable filter affixed on an outer side of the anatomical base;

a second filtering chamber comprising a removable dome with a recess in its apical portion, the recess accommodating a main removable disposable filter, the main removable disposable filter being secured to the recess by a protective grid; and means for assembling components of the second filtering chamber with the first filtering chamber.

2. The filtering mask according to claim 1, wherein the means for assembling the components comprises a set of pegs defined on the anatomical base and a closure provided with seats corresponding to the set of pegs, the set of pegs being adapted to position and fasten the removable disposable filter along its outer pre-pierced perimeter, the closure comprising a recess for containing the removable dome.

3. The filtering mask according to claim 2, wherein the set of pegs are defined on the closure and the corresponding seats are arranged on the anatomical base.

4. The filtering mask according to claim 1, wherein the removable dome has at least one hole for accommodating at least one check valve, the at least one check valve being provided with a removable filter valve.

5. The filtering mask according to claim 1, further comprising a main ventilated filter closure, wherein the protective grid is configured for replacement by the main ventilated filter closure, the main ventilated filter closure allowing for insertion of further interchangeable filters in cascade to a fan of forced ventilation of the main ventilated filter closure.

6. The filtering mask according to claim 5, wherein the main ventilated filter closure includes a control board, the control board comprising sensors for detecting air quality and a radio transmitter for remote communication.

7. The filtering mask according to claim 1, wherein the protective grid is adapted for replacement by a main ducted filter closure, the closure being employable as a pneumatic connection with remote ventilation and filtration systems.

8. The filtering mask according to claim 1, further comprising a check valve that is configured to be replaced by a fitting defined as a pneumatic connection with remote ventilation systems and remote filtration systems.

9. The filtering mask according to claim 8, wherein the check valve is configured for replacement by the fitting, and the fitting further comprises a fitting check valve.

10. The filtering mask according to claim 1, wherein the removable disposable filter and the main removable disposable filter are equipped with extraction tabs, with keys for correct insertion and are further equipped with temperature-sensitive usage markers and humidity-sensitive usage markers, the markers being employable to signal to users the previous or accidental use of the removable disposable filter and the main removable disposable filter.

11. A bidirectional reusable filtering face mask for preventing bacteriological and viral contaminations transmissible by means of respiratory droplets emissions, comprising:

an anatomical base, the anatomical base comprising means for adherence to a face and pass-through elements employable for closing the mask by means of ties, the mask comprising:

a first filtering chamber configured to prevent respiratory droplets from spreading, the first filtration chamber comprising a removable disposable filter affixed on an outer side of the anatomical base;

a second filtering chamber comprising a removable dome with a recess in its apical portion, the recess accommodating a main removable disposable filter, the main removable disposable filter being secured to the recess by a protective grid; and means for assembling components of the second filtering chamber with the first filtering chamber, wherein:

the means for assembling the components comprises a set of pegs defined on the anatomical base and a closure provided with seats corresponding to the set of pegs, the set of pegs are adapted to position and fasten the removable disposable filter along its outer pre-pierced perimeter, the closure comprising a recess for containing the removable dome, and the set of pegs are defined on the closure and the corresponding seats are arranged on the anatomical base.

12. The filtering mask according to claim 11, wherein the removable dome has at least one hole for accommodating at least one check valve, the at least one check valve being provided with a removable filter valve.

13. The filtering mask according to claim 11, further comprising a main ventilated filter closure, wherein the main ventilated filter closure includes a control board, the control board comprising sensors for detecting air quality and a radio transmitter for remote communication.

14. The filtering mask according to claim 11, wherein the protective grid is adapted for replacement by a main ducted filter closure, the main ducted filter closure being employable as a pneumatic connection with remote ventilation and filtration systems.

15. The filtering mask according to claim 11, further comprising a check valve that is configured to be replaced by a fitting defined as a pneumatic connection with remote ventilation systems and remote filtration systems.

16. The filtering mask according to claim 15, wherein the check valve is configured for replacement by the fitting, and the fitting further comprises a fitting check valve.

17. The filtering mask according to claim 11, wherein the removable disposable filter and the main removable disposable filter are equipped with extraction tabs, with keys for correct insertion and are further equipped with temperature-sensitive usage markers and humidity-sensitive usage markers, the markers being employable to signal to users the previous or accidental use of the removable disposable filter and the main removable disposable filter.

18. A bidirectional reusable filtering face mask for preventing bacteriological and viral contaminations transmissible by means of respiratory droplets emissions, comprising:

an anatomical base, the anatomical base comprising means for adherence to a face and pass-through elements employable for closing the mask by means of ties, the mask comprising:

a first filtering chamber configured to prevent respiratory droplets from spreading, the first filtration chamber comprising a removable disposable filter affixed on an outer side of the anatomical base;

a second filtering chamber comprising a removable dome with a recess in its apical portion, the recess accommodating a main removable disposable filter, the main removable disposable filter being secured to the recess by a protective grid, wherein the protective grid is adapted for replacement by a main ducted filter closure, the closure being employable as a pneumatic connection with remote ventilation and filtration systems; and means for assembling components of the second filtering chamber with the first filtering chamber.

19. The filtering mask according to claim 18, wherein the removable dome has at least one hole for accommodating at least one check valve, the at least one check valve being provided with a removable filter valve.

20. The filtering mask according to claim 18, further comprising a main ventilated filter closure, wherein the protective grid is configured for replacement by the main ventilated filter closure, the main ventilated filter closure allowing for insertion of further interchangeable filters in cascade to a fan of forced ventilation of the main ventilated filter closure.

* * * * *